Aug. 16, 1966  C. E. WELLER ETAL  3,267,254
COMBINATION TRANSFORMER UNIT AND SOLDERING IRON STAND
Filed March 31, 1964  2 Sheets-Sheet 1
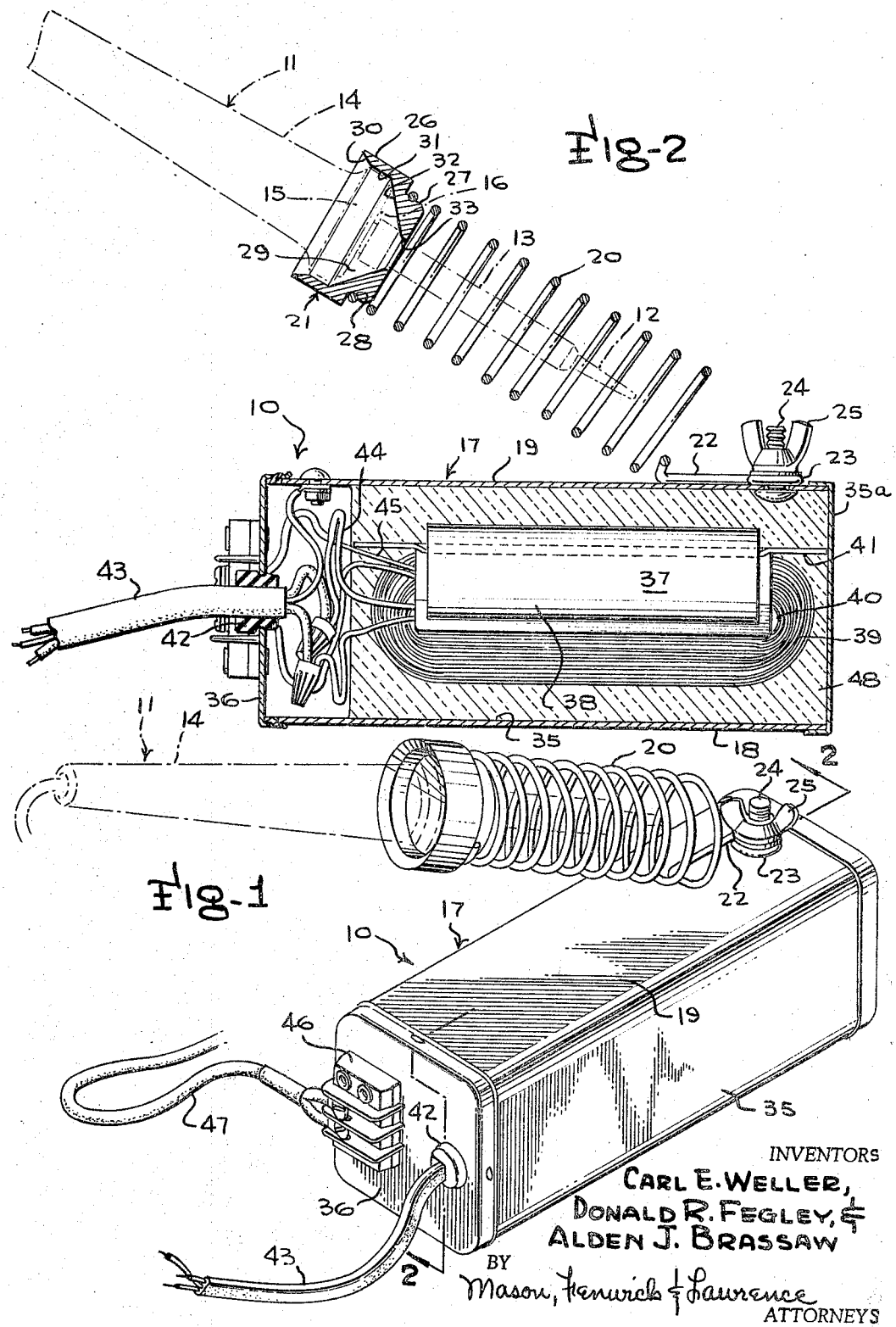
INVENTORS
CARL E. WELLER,
DONALD R. FEGLEY, &
ALDEN J. BRASSAW
BY
Mason, Fenwick & Lawrence
ATTORNEYS Aug. 16, 1966  C. E. WELLER ETAL  3,267,254
COMBINATION TRANSFORMER UNIT AND SOLDERING IRON STAND
Filed March 31, 1964  2 Sheets-Sheet 2
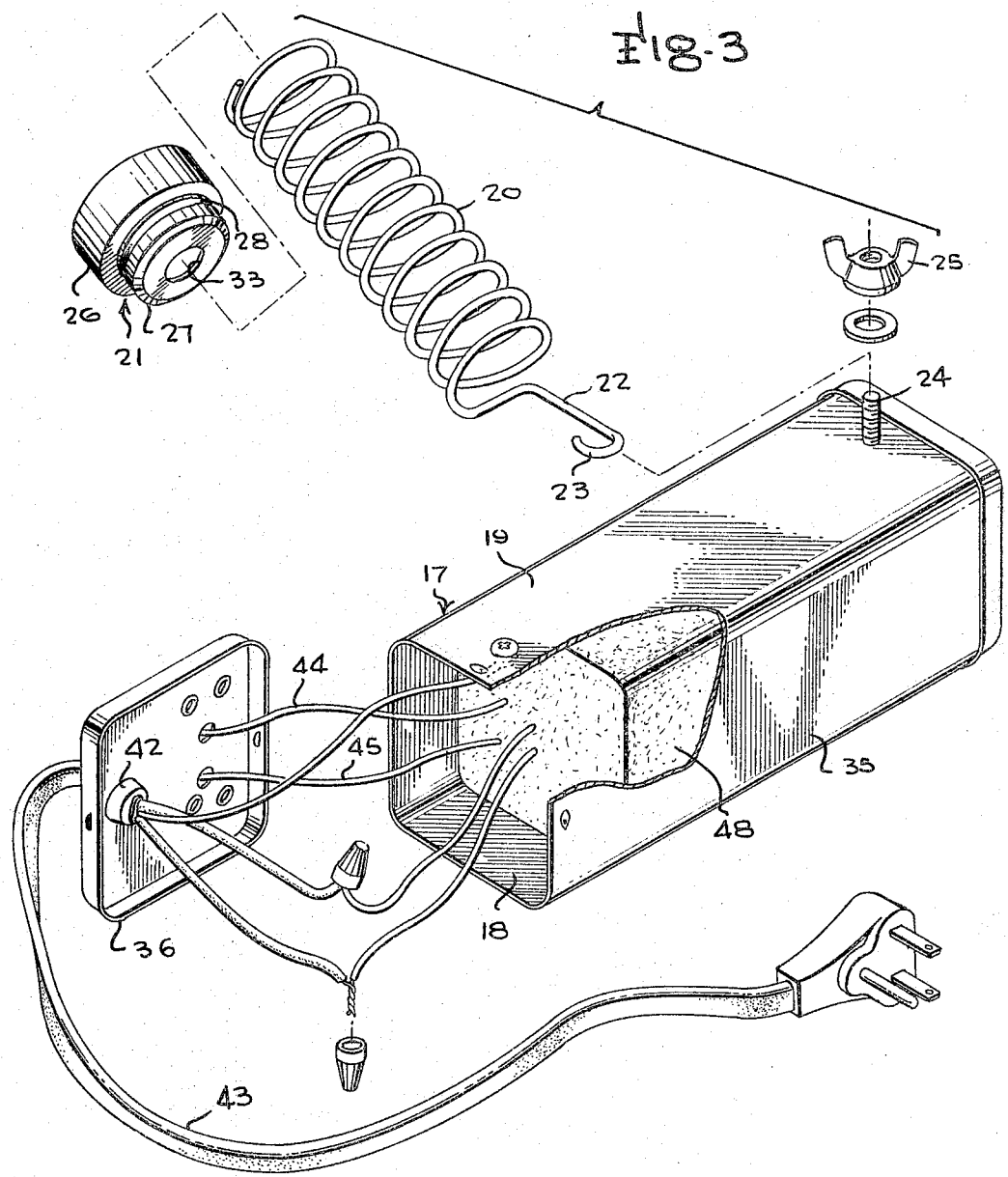
INVENTORS
CARL E. WELLER,
DONALD R. FEGLEY, &
ALDEN J. BRASSAW
BY Mason, Fenwick & Lawrence
ATTORNEYS

United States Patent Office 3,267,254
Patented August 16, 1966

3,267,254
COMBINATION TRANSFORMER UNIT AND SOLDERING IRON STAND
Carl E. Weller and Donald R. Fegley, Easton, Pa., and Alden J. Brassaw, Phillipsburg, N.J., assignors to Weller Electric Corporation, Easton, Pa., a corporation of Pennsylvania
Filed Mar. 31, 1964, Ser. No. 356,252
6 Claims. (Cl. 219—242)

The present invention relates in general to supports for heated devices, and more particularly to supporting stands for low voltage, electrically heated soldering irons wherein the base of the supporting stand serves also as a step-down transformer for converting a supply voltage of conventional commercial or domestic voltage levels to low voltage levels appropriate to the heating element of the soldering iron.

The particular form of the present invention illustrated in the drawings is designed especially for soldering irons of the low voltage type having an elongated, pencil-like barrel and soldering tip of small diameter and a handle having at least a portion immediately adjacent the barrel of larger diameter, and the invention will be described with respect to such a soldering iron. It will be apparent, however, that the invention is applicable to provide a supporting stand for other electrically heated devices having a configuration suitable to enable its support and protection from burning or undesirable contact with adjacent objects and especially where voltage transformation from conventional supply voltage levels is desired.

It has been long recognized that soldering irons and other electrically heated devices of similar nature and use present serious problems in regard to protection of the heated portion of the device against contact with other objects such as insulated wires, workbench equipment and paraphenalia, inflammable material in the vicinity, and the like, and especially against accidental contact with the user or other persons. Unprotected soldering irons represent a continuous fire hazard and safety problem so long as the tip and barrel remain in heated condition. Heretofore, several varieties of stands having an upwardly opening cradle or trough for supporting the soldering iron, usually in a generally horizontal position, when not in actual soldering use have been produced, but such stands have usually suffered the disadvantage of not shielding the heated portions of the iron against injurious contact from direction above the iron, they do not support the iron in attitudes approximating the normal use attitude of the iron, and are frequently of relatively expensive and complex manufacture.

An object of the present invention is the provision of a novel supporting stand for soldering irons and similar electrically heated devices which is of relatively simple construction involving a minimum number of components, and which supports the iron in a convenient attitude approximating the normal use attitude of the iron while shielding the heated parts of the iron along all directions from accidental contact with other objects.

Another object of the present invention is the provision of a novel supporting stand for soldering irons and similar electrically heated devices, incorporating in the stand base an electrical transformer for converting conventional supply voltages to different voltage levels suitable for miniaturized heating elements.

Another object of the present invention is the provision of a novel supporting stand for soldering irons and similar electrically heated devices having a small diameter, elongated heated work portion, wherein a coil spring extending upwardly from a supported end along an inclined axis approximating the normal work attitude of a soldering iron and terminating in a collet-like element encircles the heated work portion along the whole length of the latter to protect against accidental contact with other objects.

Other objects, advantages, and capabilities of the present invention will become apparent from the following detail description, taken in conjunction with the accompanying drawings illustrating a preferred embodiment of the invention.

In the drawings:
FIGURE 1 is a perspective view of a soldering iron stand embodying the present invention, with a typical soldering iron for which the same is designed illustrated in supported position in broken lines;
FIGURE 2 is a vertical longitudinal section view of the construction illustrated in FIGURE 1, taken along the line 2—2 of FIGURE 1; and
FIGURE 3 is an exploded perspective view of the soldering iron stand, with part of the base broken away.

Referring to the drawings, wherein like reference characters designate corresponding parts throughout the several figures, the supporting stand of the present invention is indicated in general by the reference character 10, and is specifically designated in this embodiment to support a low voltage electrically heating soldering iron illustrated in broken lines at 11 and including a tip 12, an elongated barrel 13 of small diameter, and a handle 14 having a narrow cylindrical flange portion 15 of considerably larger diameter than the barrel 13 providing an annular transition surface 16 at the juncture between the barrel and handle. The soldering iron in this specific instance is designed to operate on an A.C. supply voltage of about 24 volts, so as to reduce insulation problems and size of components, particularly the size of the heating element or winding, to permit attainment of the small diameter barrel and tip.

The soldering iron stand 10 comprises a base member 17 having a flat bottom surface 18 and a flat upper surface 19 paralleling the surface 18, on which is surmounted the soldering iron holding components formed solely of a coil spring or similar helical shield member 20 having a greater axial length than the barrel and tip portions of the soldering iron and a collet member 21 assembled to the coil spring shield member 20 at the upper end thereof. The coil spring shield member 20 is removably supported on the upper surface 19 of the base 17 along an upwardly inclining axis approximating the normal use attitude of the soldering iron by providing at the lower end of the coil spring shield member 20 an integral straight or substantially rectilinear extension leg 22 terminating in an integrally formed loop 23 providing an opening of suitable diameter to receive the threaded shank of a mounting bolt 24 secured to the base 17 and be held in assembled relation thereto by a wing nut 25.

The collet 21 provides a generally funnel shaped mounting socket for the soldering iron 11 and is formed of an integral metallic ring having a generally cylindrical exterior surface portion 26 and a constricted diameter neck 27 at the lower end thereof suitably grooved along the cylindrical periphery, as indicated at 28 to receive portions of the uppermost turn or turns of the coil spring shield member 20 and frictionally restrain the same in assembled relation. An upwardly opening, generally funnel shaped socket or well 29 is provided in the collet 21, the bounding surface of which includes, in serial fashion progressing axially from the upper to the lower end of the collet, a conically flaring entrance region 30, a cylindrical medial region 31, a truncated conical lower region 32 and a small diameter exit opening 33 which is just slightly larger than the diameter of the soldering iron barrel 13 to accommodate the same therethrough.

In the specifically illustrated embodiment, the base 17 is formed of a canned step-down transformer adapted to convert the conventional commercially or domestically available supply voltage of 110 volts to about 24 volts for supply to the soldering iron. This base 17 includes a can 35 in the general configuration of a rectangular solid having a removable lid 36, the receptacle portion of the can housing a transformer 37 which in this instance has a spiral wound core 38 providing a hollow center through which primary windings 39 and secondary windings 40 extend, the primary windings being preferably wound about the secondary. For example, the primary and secondary windings may be formed of about 400 turns and 96 turns respectively. The transformer core and primary herein described and illustrated is generally of the type disclosed in earlier U.S. Patent No. 2,699,195, granted to Carl E. Weller, one of the co-inventors hereof, on January 11, 1955. Extending through the core 38 is a tightening bar 41 employed as an anchor to tighten the core steel at the time of manufacture and serving to anchor the transformer in the potting compound, later described. The ends of the primary windings 39 are coupled by wire connectors to the conductors of a supply cord 43 extending through a suitable insulating collar 42 in an accommodating opening in the can lid 36 to the 110 volt source, such as an access socket. The ends of the wire forming the secondary windings 40 extend through the lid to a terminal strip 46 to provide terminals for connection to conductors 47 through which a 24-volt A.C. supply is made available to the soldering iron.

The transformer assembly 37 within the can 35 is preferably restrained in position against accidental dislodgment by embedding the same in a suitable potting compound 48, which may, for example, be a potting wax having a sufficiently high melting point to avoid melting of the same by the heat losses from the transformer. Alternatively, the transformer may be rigidly supported within the container 35 by suitable supporting brackets fixed to a wall of the container or transversely spanning and connected to the transformer core or tightening bar.

In ordinary use of the above-described soldering iron supporting stand, the stand is arranged in the position illustrated in FIGURE 2, or standing on the end 35a of the can, and the soldering iron is removably supported in the mounting portion formed by the coil spring shield member 20 and collet 21 by merely inserting the tip and barrel portions of the soldering iron through the exit opening 33 in the collet 21 and guiding the soldering iron axially of the coil spring shield member until the cylindrical flange portion 15 of the handle nests in the cylindrical medial portion 31 of the collet and bottoms against the portion 31 or the uppermost portion of the conical lower portion 32, and the barrel rests against a surface of the exit opening 33. Thus the axially spaced abutment surfaces for portions of the iron formed by the medial portion 31 and exit opening 33 determine the attitude or position of the iron. In this condition the entire barrel 13 and tip 12 of the soldering iron, which are the metallic portions of the soldering iron containing the residual heat, are completely encircled by the convolutions of the coil spring shield member 20 over the whole axial length thereof, to protect these portions of the soldering iron against accidental contact by other objects which might be injured by the heat from all directions of approach to the barrel and tip portions of the iron.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A supporting stand for electrically heated devices having an elongated work portion adapted to be electrically heated and a handle rigidly affixed thereto having a circular cross section end portion of large diameter than the work portion immediately adjacent the latter, the stand comprising a rigid base member having a flat bottom surface and a second flat surface portion, a subassembly for receiving the work portion of the electrically heated device and supporting the same along a selected upwardly inclined axis simulating the use attitude thereof and shielded against contact with exterior objects comprising a helical coil spring of greater axial length and diameter than said work portion having a mounted extension at the lower end thereof providing plural contact points lying in a single plane to be secured to said base member against said second flat surface portion and thereby position the coil spring about said upwardly inclined axis, and an annular collet member secured to the other end of said coil spring in coaxial alignment therewith having a constricted exit opening for passage therethrough of said work portion into coaxial encircled relation in said coil spring and an enlarged well opening upwardly along said axis bounded by annular surfaces to receive and support said handle end portion in nested relation therein with said work portion positioned substantially along said axis and spaced out of contact with said coil spring.

2. A supporting stand for electrically heated devices having an elongated work portion adapted to be electrically heated and a handle rigidly affixed thereto having a circular cross section end portion of larger diameter than the work portion immediately adjacent the latter, the stand comprising a rigid base member having a flat bottom surface and a flat upper surface portion paralleling the bottom surface, a subassembly for receiving the work portion of the electrically heated device and supporting the same along a selected upwardly inclined axis simulating the use attitude thereof and shielded against contact with exterior objects comprising a helical coil spring of greater axial length and diameter than said work portion having an elongated integral extension terminating in an open loop at the lower end thereof providing plural contact points lying in a single plane to be secured to said base member against said flat upper surface portion and thereby position the coil spring about said upwardly inclined axis, and an annular collet member secured to the other end of said coil spring in coaxial alignment therewith having a constricted exit opening for passage therethrough of said work portion into coaxial encircled relation in said coil spring and an enlarged well opening upwardly along said axis bounded by annular surfaces to receive and support said handle end portion in nested relation therein with said work portion positioned substantially along said axis and spaced out of contact with said coil spring.

3. A supporting stand for electrically heated soldering irons of the type having an elongated, generally cylindrical barrel and tip subassembly of small diameter and a handle rigidly affixed in coaxially aligned relation thereto having an end portion of circular cross section immediately adjacent the barrel and tip subassembly and joined thereto by an annular transition surface, the stand comprising a rigid base member having a flat bottom surface and a flat upper surface, a mounting subassembly for receiving the barrel and tip subassembly and supporting the same along a selected upwardly inclined axis simulating the use attitude of the iron with the handle projecting in exposed relation therefrom comprising a coil spring forming a helix of greater axial length and diameter than said barrel and tip subassembly having an integral mounting formation at the lower end thereof providing plural contact points lying in a selected plane to be secured to said base member against said flat upper surface portion and thereby position said coil spring along said upwardly inclined axis, and an annular collet member secured to the other end of said coil spring in coaxial alignment therewith having a constricted exit opening for passage therethrough of said barrel and tip subassembly into coaxial encircled relation in said coil spring and an enlarged well opening upwardly along said axis bounded by annular surfaces to receive and support said handle end portion in nested relation therein with said barrel and tip subassembly positioned substantially along said axis and spaced out of contact with said coil spring.

4. A supporting stand for electrically heated soldering irons of the type having an elongated, generally cylindrical barrel and tip subassembly of small diameter and a handle rigidly affixed in coaxially aligned relation thereto having an end portion of circular cross section immediately adjacent the barrel and tip subassembly and joined thereto by an annular transition surface, the stand comprising a rigid base member having a flat bottom surface and a flat upper surface, a mounting subassembly for receiving the barrel and tip subassembly and supporting the same along a selected upwardly inclined axis simulating the use attitude of the iron with the handle projecting in exposed relation therefrom comprising a coil spring forming a helix of greater axial length and diameter than said barrel and tip subassembly having an integral mounting formation at the lower end thereof providing plural contact points lying in a selected plane to be secured to said base member against said flat upper surface portion and thereby position said coil spring along said upwardly inclined axis, and an annular collet member secured to the other end of said coil spring in coaxial alignment therewith having a constricted exit opening for passage therethrough of said barrel and tip subassembly into coaxial encircled relation in said coil spring and an enlarged well opening upwardly along said axis bounded by annular surfaces including a cylindrical surface portion conforming substantially to the diameter of said handle end portion and a truncated conical surface portion extending therefrom to said exit opening to receive and abut in supporting relation said handle end portion in nested condition therein and restrain the same in a position disposing said barrel and spring subassembly within the coil spring along said axis and spaced out of contact with the coil spring.

5. In a supporting stand for soldering irons as defined in claim 3, said base member comprising a canned step-down transformer including an outer container in substantially the configuration of a rectangular solid whereby a pair of opposite surfaces thereof form said bottom surface and upper surface portion of the base member, a power input cable extending into said outer container from the exterior thereof, terminal means carried on the exterior of said outer container providing terminals for connection to a power input lead of the soldering iron, and means connecting said terminals to the secondary of said transformer.

6. In a supporting stand for soldering irons as defined in claim 4, said base member comprising a canned step-down transformer including an outer container in substantially the configuration of a rectangular solid whereby a pair of opposite surfaces thereof form said bottom surface and upper surface portion of the base member, said transformer providing stepped-down voltages relative to commercial supply voltage levels for application to the associated soldering iron and including fastening means for securing said integral mounting formation at the lower end of said coil spring for removably securing the same thereto, a power input cable extending into said outer container from the exterior thereof, terminal means carried on the exterior of said outer container providing terminals for connection to a power input lead of the soldering iron, and means connecting said terminals to the secondary of said transformer.

References Cited by the Examiner

UNITED STATES PATENTS

| 2,171,486 | 8/1939 | Van Fleet | 248—94 X |
| 2,216,255 | 10/1940 | Tate | 248—153 X |
| 2,475,941 | 7/1949 | Brothers | 219—242 X |
| 3,215,815 | 11/1965 | Lerner | 219—242 |

FOREIGN PATENTS

| 353,142 | 3/1961 | Switzerland. |

ANTHONY BARTIS, *Primary Examiner.*